United States Patent
Yamakado et al.

(10) Patent No.: US 8,122,351 B2
(45) Date of Patent: Feb. 21, 2012

(54) DOCUMENT EDIT DEVICE AND STORAGE MEDIUM

(75) Inventors: Hitoshi Yamakado, Hino (JP); Atsushi Nagahara, Chino (JP)

(73) Assignee: Seiko Epson Corporation (JP)

( * ) Notice: Subject to any disclaimer, the term of this patent is extended or adjusted under 35 U.S.C. 154(b) by 1032 days.

(21) Appl. No.: 12/069,754

(22) Filed: Feb. 12, 2008

(65) Prior Publication Data

US 2008/0201635 A1    Aug. 21, 2008

(30) Foreign Application Priority Data

Feb. 20, 2007   (JP) ................................ 2007-039546

(51) Int. Cl.
*G06F 17/00* (2006.01)

(52) U.S. Cl. .................... 715/255; 715/243; 715/244

(58) Field of Classification Search .................. 715/255, 715/243, 244
See application file for complete search history.

(56) References Cited

U.S. PATENT DOCUMENTS

| | | | |
|---|---|---|---|
| 6,014,450 A * | 1/2000 | Heilper et al. ................ | 382/101 |
| 6,373,506 B1 | 4/2002 | Hosomi | |
| 7,554,462 B2 | 6/2009 | Mori | |
| 7,640,269 B2 * | 12/2009 | Yoshida et al. ................ | 1/1 |
| 2006/0227153 A1 * | 10/2006 | Anwar et al. ................ | 345/660 |
| 2008/0024501 A1 | 1/2008 | Yamakado et al. | |
| 2008/0024502 A1 * | 1/2008 | Nagahara et al. ............ | 345/472 |
| 2010/0180226 A1 * | 7/2010 | Satterfield et al. ............ | 715/777 |

FOREIGN PATENT DOCUMENTS

| | | |
|---|---|---|
| EP | 0 622 728 A1 | 11/1994 |
| JP | 08-180037 | 7/1996 |
| JP | 10-289262 | 10/1998 |
| JP | 10-301980 | 11/1998 |
| JP | 2000-200354 | 7/2000 |
| JP | 2006-330857 | 12/2006 |
| JP | 3915813 | 2/2007 |
| JP | 2008-033892 | 2/2008 |
| JP | 2008-035475 | 2/2008 |
| JP | 2008-065587 | 3/2008 |
| JP | 2008-140158 | 6/2008 |
| JP | 2008-141495 | 6/2008 |
| JP | 2008-141496 | 6/2008 |
| JP | 2008-186332 | 8/2008 |
| JP | 2008-191746 | 8/2008 |
| JP | 2008-197835 | 8/2008 |
| JP | 2008-197990 | 8/2008 |
| JP | 2008-198011 | 8/2008 |
| JP | 2008-204179 | 9/2008 |

OTHER PUBLICATIONS

Der Goldene Schnitt, "Golden Rectangle", created Nov. 6, 1997, http://www.daube.ch/docu/glossary/goldenrect.html, pp. 1-3.*

(Continued)

*Primary Examiner* — Chau Nguyen
(74) *Attorney, Agent, or Firm* — Harness, Dickey & Pierce, P.L.C.

(57) ABSTRACT

A document edit device includes: an object obtaining unit that obtains objects each being data expressing at least one of a text and an image which are included in a document as an edit target to be edited; an object selection unit that selects at least two target objects from among the objects obtained by the object obtaining unit, the target objects each being an object as a processing target to be processed; a golden rectangle forming unit that forms a golden rectangle having a predetermined positional relationship with at least one target object of the at least two target objects selected by the object selection unit, based on a size or position of the at least one target object; and a position change unit that changes positions of the at least two target objects such that they are inscribed to the golden rectangle formed by the golden rectangle forming unit.

10 Claims, 9 Drawing Sheets

OTHER PUBLICATIONS

Ch'ng, Eugene "Simulation of a Design Environment of Users to Incorporate Proportioning Systems into Screen Design," Multimedia University, Jan. 2002.

"Microsoft Power Point User's Guide", First Edition, Microsoft Corporation, Jul. 28, 1994, pp. 66-70 (in Japanese with partial translation).

Rin, Yano, "Stylesheet Design and Pulling Power Chapter 1 Web Layout Design", Web Creators MDN Corporation, Japan, vol. 51, pp. 36-49, Mar. 1, 2006 (in Japanese with partial translation).

"Microsoft Power Point User's Guide", First Edition, Microsoft Corporation, Jul. 28, 1994, pp. 66-70 (with full English translation).

Rin, Yano, "Stylesheet Design and Pulling Power Chapter 1 Web Layout Design", Web Creators MDN Corporation, Japan, vol. 51, pp. 36-49, Mar. 1, 2006 (with full English translation).

* cited by examiner

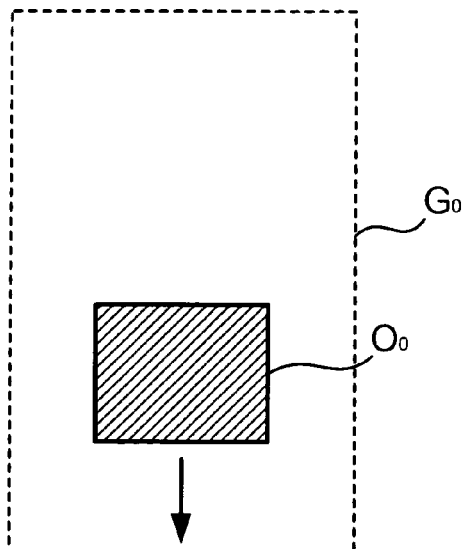
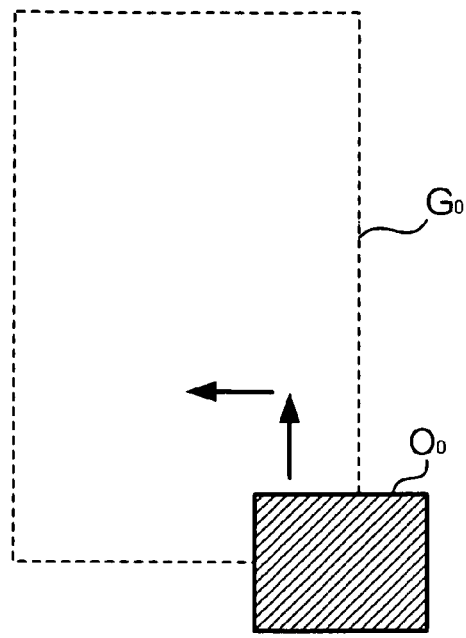
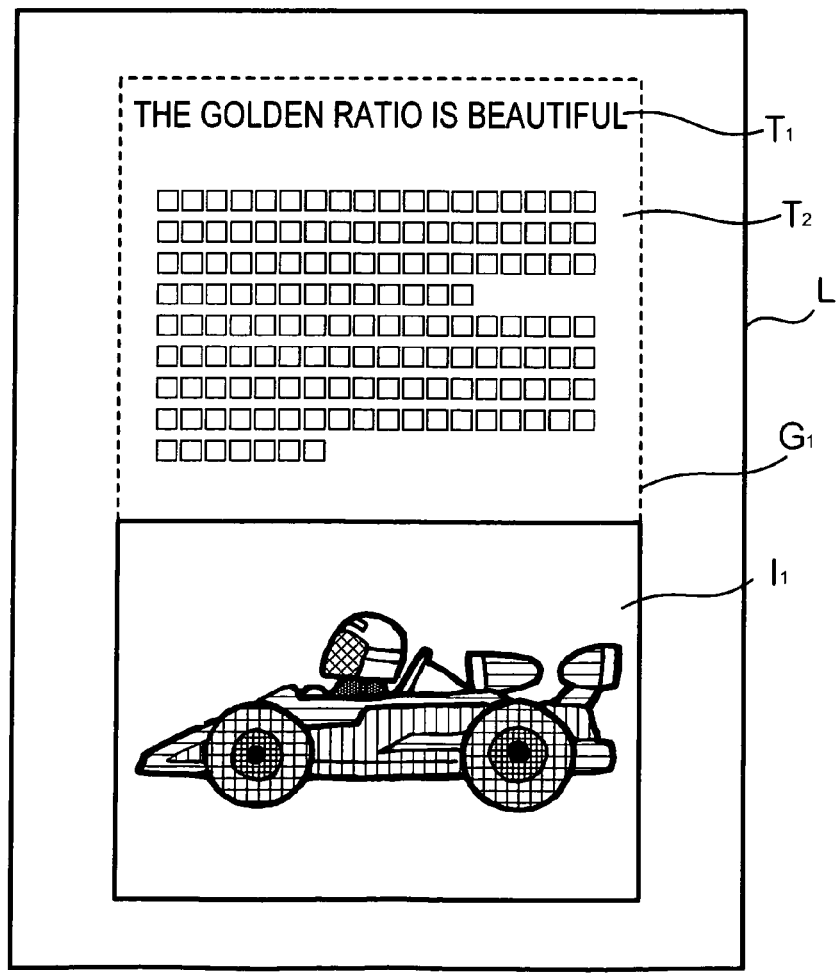

DOCUMENT EDIT DEVICE AND STORAGE MEDIUM

CROSS REFERENCE TO RELATED APPLICATIONS

The entire disclosures of Japanese Patent Application No. 2007-39546 filed on Feb. 20, 2007 is expressly incorporated by reference herein.

BACKGROUND

1. Technical Field

The present invention relates to a technique for editing a document.

2. Related Art

There are known techniques for editing a document which includes objects (digital content items) such as texts (character strings) or images digitized as data. For example, JP-A-8-180037 discloses a support system for preparation of presentation material by which, when layout or shape of a part is changed, a visual comfort level of the part is calculated. JP-A-10-289262 and JP-A-10-301980 disclose devices which evaluate and create a design. According to these two publications, stored proportion data and input design data are displayed, composited with each other. JP-A-2000-200354 discloses a technique for extracting composition information and for reconstructing a picture on the basis of the extracted composition information.

Even using the techniques according to the publications described above, it is difficult to rearrange objects so as to attain a well-balanced or aesthetically pleasing layout throughout a whole document.

SUMMARY

In this respect, the invention provides a technique for automatically changing locations of objects to attain a well-balanced or aesthetically pleasing layout of objects throughout a whole document.

According to one aspect of the invention, there is provided a document edit device including: an object obtaining unit that obtains objects each being data expressing at least one of a text and an image which are included in a document as an edit target to be edited; an object selection unit that selects at least two target objects from the objects obtained by the object obtaining unit, the target objects each being an object as a processing target to be processed; a golden rectangle forming unit that forms a golden rectangle having a predetermined positional relationship with at least one target object of the at least two target objects selected by the object selection unit, based on a size or position of the at least one target object; and a position change unit that changes positions of the at least two target objects such that they are inscribed to the golden rectangle formed by the golden rectangle forming unit.

According to the document edit device, positions of target objects are changed such that they are inscribed to a golden rectangle.

Alternatively, the document edit device may be configured so that the object obtaining unit obtains at least three objects, and the object selection unit selects one combination from possible combinations each including at least two objects from among the obtained at least three objects, so that a circumscribed rectangle circumscribed to the at least two objects which are included in the selected one combination is closest to a golden rectangle.

According to the document edit device, positions of target objects are changed so that a target object whose initial position is closest to a golden rectangle is inscribed to the golden rectangle.

Alternatively, the document edit device may be configured so that the object obtaining unit obtains at least three objects, and the object selection unit selects a combination of only text objects or only image objects, from the obtained at least three objects.

According to the document edit device, objects of the same type are selected as the target objects.

Still alternatively, the document edit device may be configured so that the object selection unit selects at least two objects from the obtained at least three objects, in an order starting with an object having a greatest text volume.

According to the document edit device, objects are selected as target objects in an order starting with an object including a greatest text volume.

Alternatively, the document edit device may be configured so that the object obtaining unit obtains at least three objects, and the object selection unit selects at least two objects from the obtained at least three objects, in an order starting with an object having a greatest area.

According to the document edit device, objects are selected as target objects in an order starting with an object having a greatest area.

Alternatively, the document edit device may be configured so that the object obtaining unit obtains at least three objects each having category information indicating a category, and the object selection unit selects at least two objects from the obtained at least three objects, the selected at least two objects each having category information of the same category.

According to the document edit device, a combination of objects classified in a particular category are selected as the target objects.

Alternatively, the document edit device may be configured so that the object obtaining unit obtains at least three objects each having attribute information indicating an attribute, the document edit device further including an importance level determination unit that determines an importance level for each of the obtained at least three objects, based on the attribute information of each of the obtained at least three objects, and the object selection unit selecting at least two objects from the obtained at least three objects, in an order starting with an object having a highest importance level.

According to the document edit device, the target objects are selected in an order starting with an object having a highest priority.

According to another aspect of the invention, there is provided a program causing a computer device to execute a process, the process including: obtaining objects each being data expressing at least one of a text and an image which are included in a document as an edit target to be edited; selecting at least two target objects from among the obtained objects, the target objects each being an object as a processing target to be processed; forming a golden rectangle having a predetermined positional relationship with at least one target object of the selected at least two target objects, based on a size or position of the at least one target object; and changing positions of the at least two target objects such that they are inscribed to the formed golden rectangle.

According to still another aspect of the invention, there is provided a storage medium storing the program described above.

According to the program, location of target objects are changed to be inscribed to a golden rectangle.

BRIEF DESCRIPTION OF THE DRAWINGS

Embodiments of the invention will be described in detail based on the following figures, wherein:

FIG. 7 shows an example of an object before it is moved;

FIG. 8 shows another example of an object before it is moved;

FIG. 9 shows an example of an edited document;

DESCRIPTION OF EXEMPLARY EMBODIMENTS

1. Structure

Figure 1:
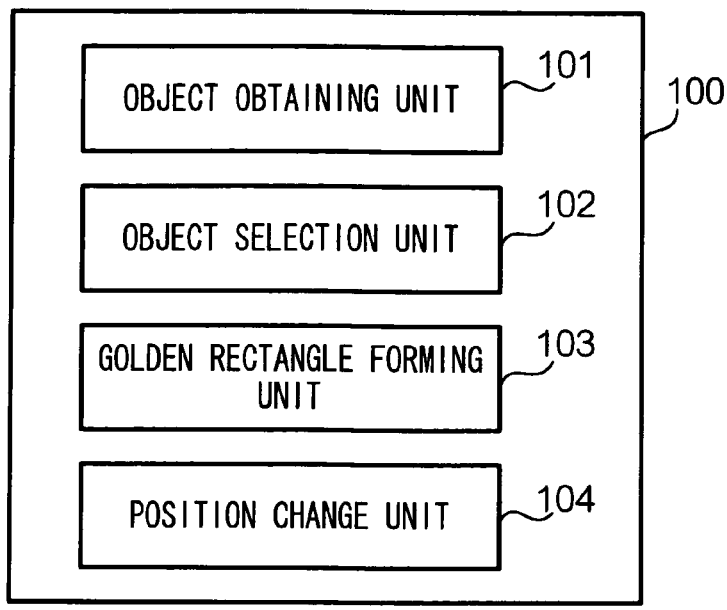
FIG. 1 shows a functional structure of a document edit device 100 according to an embodiment of the invention.

FIG. 1 shows a functional structure of a document edit device 100 according to an embodiment of the invention. The document edit device 100 edits a document so that a golden rectangle is formed based on plural objects. A "document" refers to data expressing data which includes at least one object and layout information. The object is located within a layout area, and the layout information indicates the location of the object in the layout area. Alternatively, a "document" refers to a resultant which is output based on the data. An "object" refers to data expressing at least one of a text (character string) and an image, or refers to a text or image expressed by data. A "layout area" refers to a physical boundary of a document to be output. The "layout area" refers to, for example, one or plural paper sheets on which a document is printed, one page, plural successive pages, or a partial area or partial printable area of each page.

An object obtaining unit 101 obtains objects included in a document as an edit target. An object selection unit 102 selects at least two target objects from among the obtained objects. The term "target object" refers to an object as a target to be processed. A golden rectangle forming unit 103 forms a golden rectangle on the basis of a size or position of at least one target object. The golden rectangle is formed so as to have a predetermined positional relationship with at least one target object. A position change unit 104 changes a position of a target object so that the target object is inscribed to the formed golden rectangle. The term "golden rectangle" refers to a quadrilateral having two adjacent edges of lengths between which a ratio expressed below as an equation (1) (a so-called golden ratio) is approximately made. The left and right sides of the equation (1) are replaceable with each other.

$$1 : \frac{1 + \sqrt{5}}{2} \quad (1)$$

Figure 2:
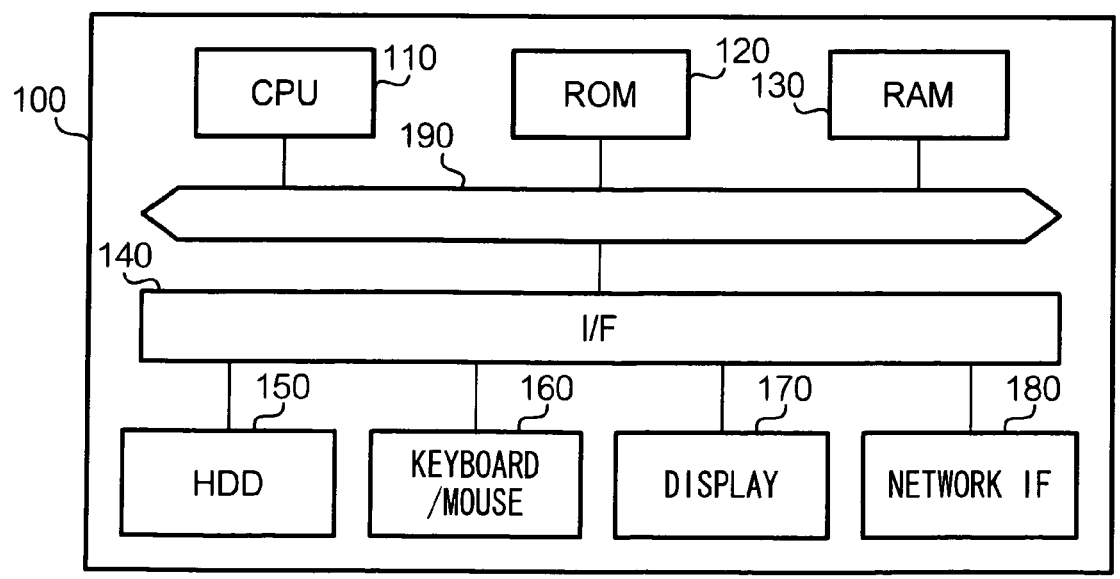
FIG. 2 shows a hardware structure of the document edit device 100.

FIG. 2 shows a hardware structure of the document edit device 100. A CPU (Central Processing Unit) 110 is a control device which controls components forming the document edit device 100. A ROM (Read Only Memory) 120 is a storage device which stores data and programs required for starting up the document edit device 100. A RAM (Random Access Memory) 130 is a storage device which functions as a work area when the CPU 110 executes programs. An I/F (Interface) 140 is an interface which allows data and control signals to be input/output from/to various input/output devices and storage devices. A HDD (Hard Disk Drive) 150 is a storage device which stores various programs and data. In this embodiment, the HDD 150 stores a document edit program for editing a document. A keyboard/mouse 160 is an input device with which users input instructions to the document edit device 100. A display 170 is an output device which displays content of data and/or states of processings. A network IF 180 is an interface for transmitting/receiving data to/from other devices connected via a network (not shown in the figures). The document edit device 100 is capable of receiving documents (more specifically, electronic data expressing a document) via a network and the network IF 180. The CPU 110, ROM 120, RAM 130, and I/F 140 are connected via a bus 190. As the CPU 110 executes a document edit program, the functional structure shown in FIG. 1 is established in the document edit device 100. The document edit device 100 may be whatever device includes the functional structure shown in FIG. 1 and the hardware structure shown in FIG. 2. For example, the document edit device 100 is a so-called personal computer. It is to be noted that the hardware structure shown in FIG. 2 may be partially omitted.

2. Operation

Figure 3:
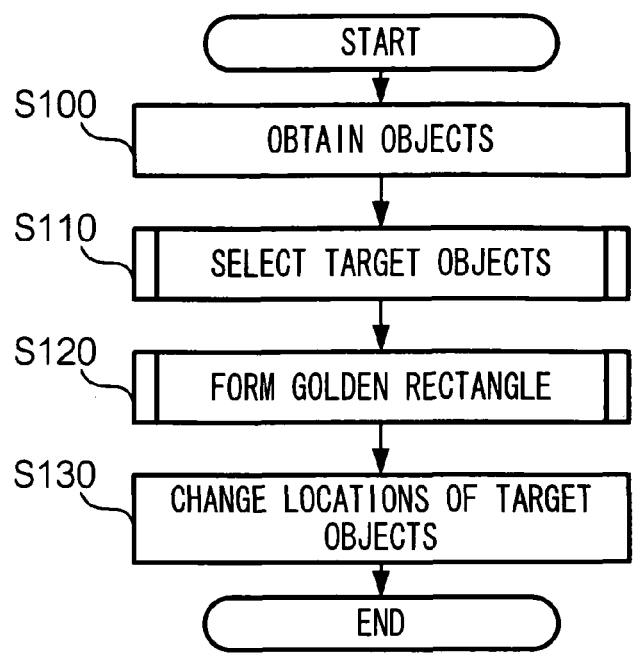
FIG. 3 is a flowchart showing operation of the document edit device 100.

FIG. 3 is a flowchart showing operation of the document edit device 100. In a step S100, the CPU 110 obtains objects. In this embodiment, each object is obtained as part of a document (hereinafter a "target document") to be edited, which is an edit target. A target document is stored in the HDD 150 prior to the process. The CPU 110 reads the target document from the HDD 150.

Figure 4:
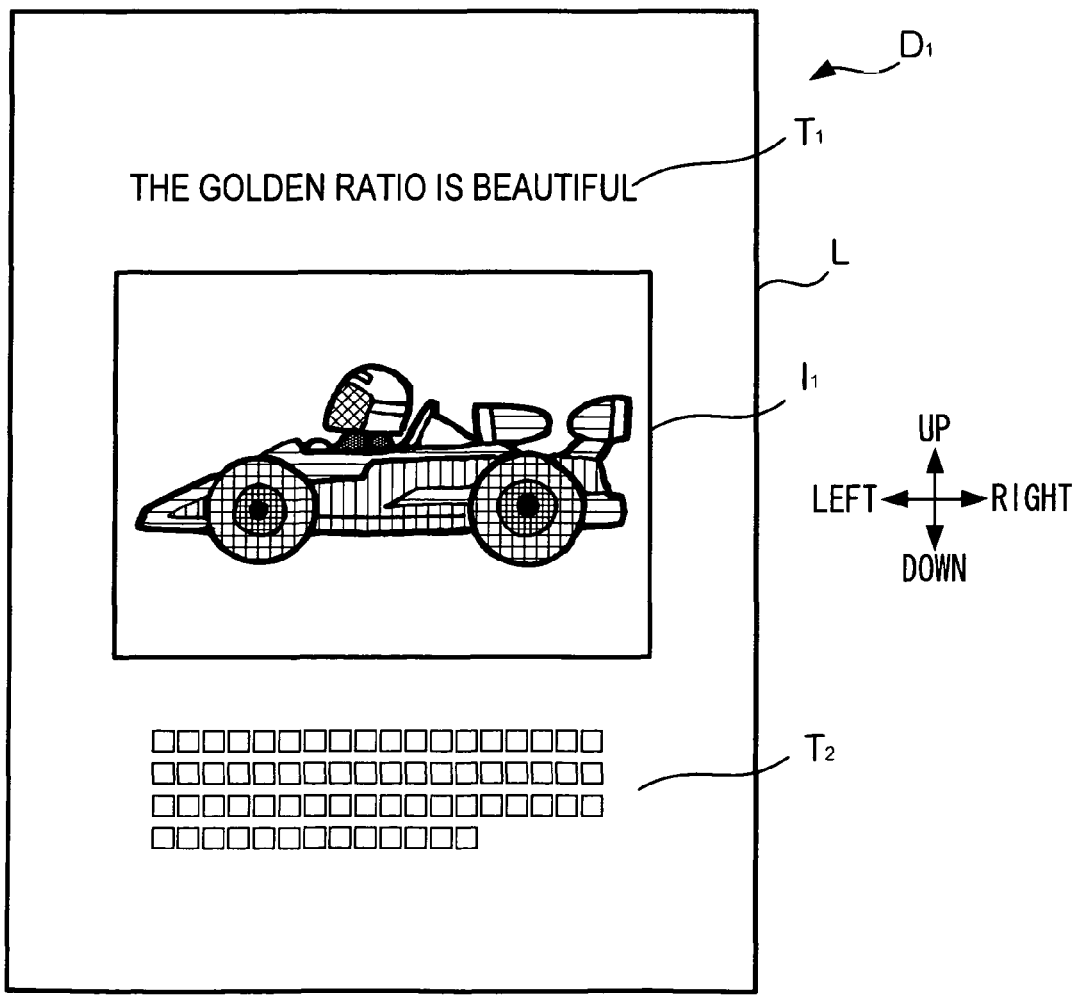
FIG. 4 shows a document D1 as a target document.

FIG. 4 shows a document $D_1$ as a target document. The document $D_1$ includes three objects $T_1$, $T_2$, and $I_1$ in a layout area. The objects $T_1$ and $T_2$ are text objects. The object $T_1$ includes a character string "THE GOLDEN RATIO IS BEAUTIFUL", and attribute information indicating an attribute of the object. The object $T_1$ includes, as attribute information, information indicating an object type "text", a category "title", a font size "48 points", a font type "gothic", a font style "bold", and a size of the object $T_1$. The object $T_2$ includes a character string and attribute information, in the same manner as the object $T_1$. Particularly, the object $T_2$ has an attribute "body". The object $I_1$ includes image information and attribute information. The object $I_1$ includes, as attribute information, an object type "image", a category "main image", and a size of the object $I_1$. The document $D_1$ includes information (hereinafter "layout information") indicating locations of the objects $T_1$, $T_2$, and $I_1$ in the layout area L.

Referring again to FIG. 3, in a step S110, the CPU 110 selects at least two target objects from a document $D_1$.

Figure 5:
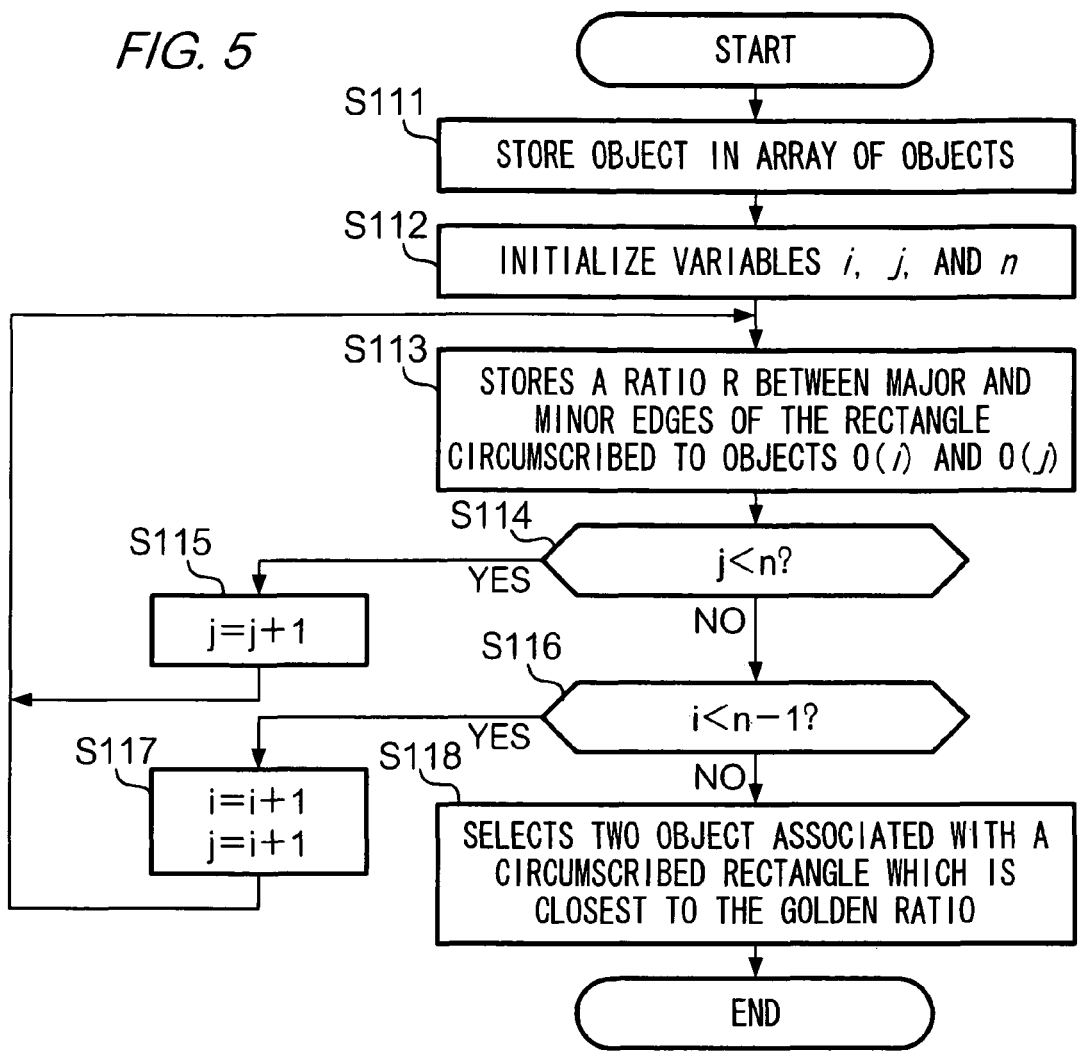
FIG. 5 is a flowchart showing details of an object selection processing.

FIG. 5 is a flowchart showing details of the object selection processing. In a step S111, the CPU 110 stores objects in an array of objects into the RAM 130. In the following, an x-th object in the array is expressed as O(x). There are now given O(1)=object $T_1$, O(2)=object $T_2$, and O(3)=object $I_1$.

In a step S112, the CPU 110 initializes variables i, j, and n. The variable i indicates an object to be compared. The variable j indicates an object to be compared with (a comparison target). The variable n indicates the total number of objects included in the document $D_1$. The CPU 110 initializes the variables to i=1, j=i+1=2, and n=3.

In a step S113, the CPU 110 obtains a rectangle circumscribed to objects O(i) and O(j). Further, the CPU 110 stores a ratio r between major and minor edges of the circumscribed rectangle into the RAM 130. There is now given r=(major edge length)/(minor edge length). The "rectangle circumscribed to objects O(i) and O(j)" refers to a rectangle which satisfies conditions as follows. (i) A rectangle shall have edges in predetermined directions (e.g., vertical directions and lateral directions). (ii) A rectangle shall internally contain both of the objects O(i) and O(j). (iii) Among rectangles which satisfy both the conditions (i) and (ii), a rectangle shall have a minimum area. The ratio r is then stored, associated with information which specifies the two objects used for calculating the values (values of variables i and j in this case).

In a step S114, the CPU 110 determines whether or not there is any object which has not yet been a comparison target, i.e., whether the variables n and j satisfy a condition of j<n or not. If it is determined that there is an object which has not yet been a comparison target (S114: YES), the CPU 110 updates the variable j to j=j+1 in a step S115. After updating the variable j, the CPU 110 shifts the processing to the step S113. If it is determined that there is not any object which has not yet been a comparison target (S114: NO), the CPU 110 shifts the processing to a step S116.

In the step S116, the CPU 110 determines whether or not there is any object which has not yet been subjected to comparison, i.e., whether the variables i and n satisfy a condition i<n−1 or not. If it is determined that there is an object which has not yet been subjected to comparison (S116: YES), the CPU 110 updates the variables i and j to i=i+1 and j=i+1. After updating the variables i and j, the CPU 110 shifts the processing to the step S113. If it is determined that there is not any object which has not yet been subjected to comparison (S116: NO), the CPU 110 shifts the processing to a step S118.

In the step S118, the CPU 110 selects two objects associated with a circumscribed rectangle which is closest to the golden ratio. That is, the CPU 110 selects as a target object a combination of objects associated with a ratio which has the smallest difference to the golden ratio, from among ratios r stored in the RAM 130.

Referring again to FIG. 3, the CPU 110 forms a golden rectangle based on a target object, in a step S120.

Figure 6:
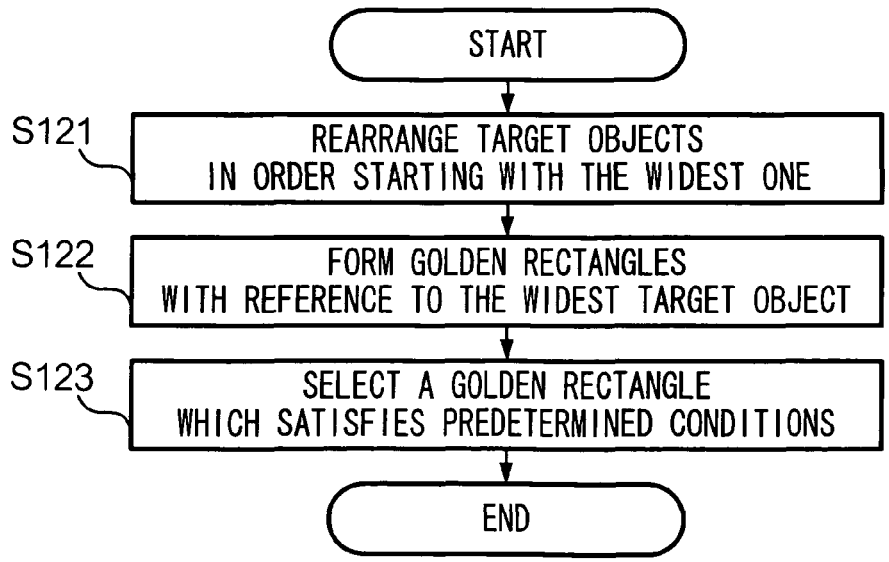
FIG. 6 is a flowchart showing details of a golden rectangle forming processing.

FIG. 6 is a flowchart showing details of the golden rectangle forming processing. In a step S121, the CPU 110 rearranges target objects in an order starting with the widest one (in lateral directions). In a step S122, the CPU 110 forms golden rectangles with reference to the widest target object (hereinafter a "reference object"). At this time, the CPU 110 forms a golden rectangle having major edges having an equal length to the width of the reference object (e.g., a laterally long golden rectangle), and a golden rectangle having minor edges having an equal length to the width of the reference object (e.g., a vertically long golden rectangle). The golden rectangles each are formed at positions where predetermined edges (hereinafter "reference edges") of the reference object and the golden rectangle correspond to each other. For example, if upper edges are the reference edges, the upper edge of each golden rectangle corresponds to the upper edge of the reference object. It is now supposed that the upper and lower edges are reference edges for a vertically long golden rectangle, and that the right and left edges are reference edges for a laterally long golden rectangle. That is, the CPU 110 forms two vertically long golden rectangles (one of which takes the upper edge as a reference edge while the other one takes the lower edge as a reference edge), and two laterally long golden rectangles (one of which takes the right edge as a reference edge while the other one takes the left edge as a reference edge).

The expression "forming a golden rectangle" is intended to mean calculation of parameters which are required to specify a golden rectangle. Golden rectangles need not always be displayed on the display 170. The parameters required to specify a golden rectangle are, for example, coordinates of four apices or coordinates of a reference point and lengths of major and minor edges.

In a step S123, the CPU 110 selects a golden rectangle which satisfies predetermined conditions, from among formed golden rectangles. The CPU 110 performs subsequent processing by using the selected golden rectangle. In this embodiment, the following conditions are used.

A golden rectangle shall not overlap objects not used for forming the golden rectangle.

A golden rectangle shall not protrude out of the layout area.

Referring again to FIG. 3, the CPU 110 changes locations of target objects on the basis of the formed golden rectangles, in a step S130. The CPU 110 changes the location of one target object other than the reference object among target objects, so that a circumscribed rectangle of the aforementioned other target object corresponds to a golden rectangle, i.e., so that the aforementioned other target object is inscribed to a golden rectangle. Since the location of each object is defined in layout information, the CPU 110 overwrites layout information.

FIG. 7 shows an example of an object before it is moved. FIG. 7 shows a case where one other object $O_O$ than a reference object is positioned inside a golden rectangle $G_O$. The CPU 110 moves the aforementioned other object in predetermined directions, e.g., in vertical directions. In this case, the aforementioned other object $O_O$ is moved in a direction to elongate a distance between a point (such as a centroid) inside a reference object and a point (such as a centroid) inside the aforementioned other object. The CPU 110 moves the aforementioned other object $O_O$ to a position where the object $O_O$ touches a golden rectangle. If a circumscribed rectangle of the target object does not correspond to the golden rectangle even by moving of the aforementioned other object $O_O$ in vertical directions, the CPU 110 moves the aforementioned other object $O_O$ in different directions, e.g., in lateral directions.

FIG. 8 shows another example of an object before being moved. FIG. 8 shows a case where one object $O_O$ other than a reference object protrudes out of a golden rectangle $G_O$. The CPU 110 moves the aforementioned other object $O_O$ in predetermined directions, e.g., in vertical directions. In this case, the object $O_O$ is moved in a direction to shorten a distance between a point (such as a centroid) inside a reference object and a point (such as a centroid) inside the aforementioned other object. The CPU 110 continues moving the other object $O_O$ until the other object $O_O$ no longer protrudes out of a golden rectangle in vertical directions. If the aforementioned other object $O_O$ still protrudes out of the golden rectangle even after moving of the other object $O_O$ in vertical directions, the CPU 110 then moves the other object $O_O$ in different directions, e.g., in lateral directions.

FIG. 9 shows an example of an edited document. In this example, objects $T_1$ and $I_1$ are selected as target objects. The objects $T_1$ and $I_1$ are located to be circumscribed to a golden rectangle $G_1$. The golden rectangle $G_1$ is a vertically long rectangle. FIG. 9 shows an example in which the condition (i) in the step S123 is not used, as will be described later.

Figure 10:
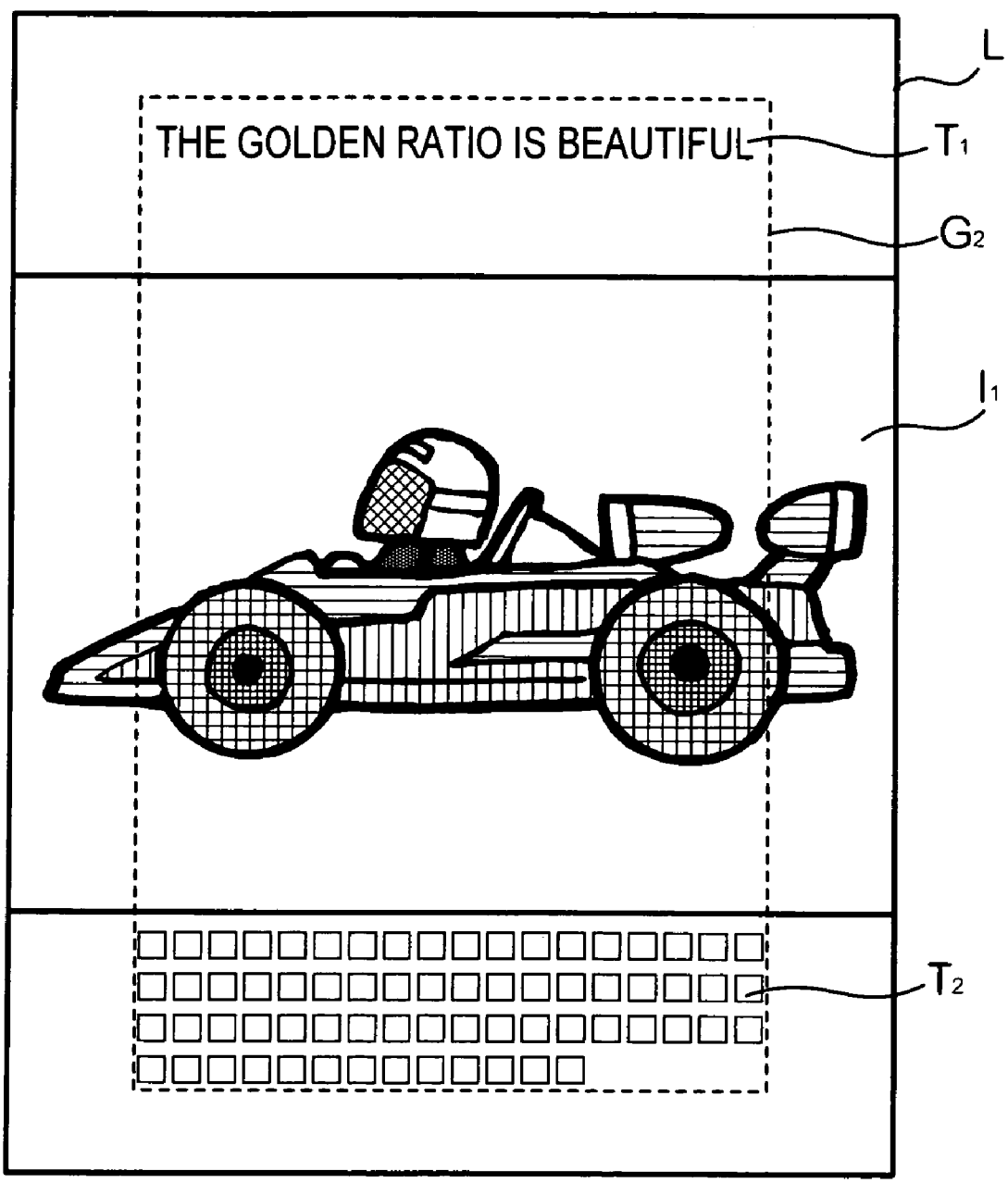
FIG. 10 shows another example of an edited document.

FIG. 10 shows another example of an edited document. In this example, objects $T_1$ and $T_2$ are selected as target objects. The objects $T_1$ and $T_2$ are located to be inscribed to a golden rectangle $G_2$. The golden rectangle $G_2$ is a vertically long golden rectangle. FIG. 10 shows an example which does not use the condition (i) in the step S123, as will described later.

Figure 11:
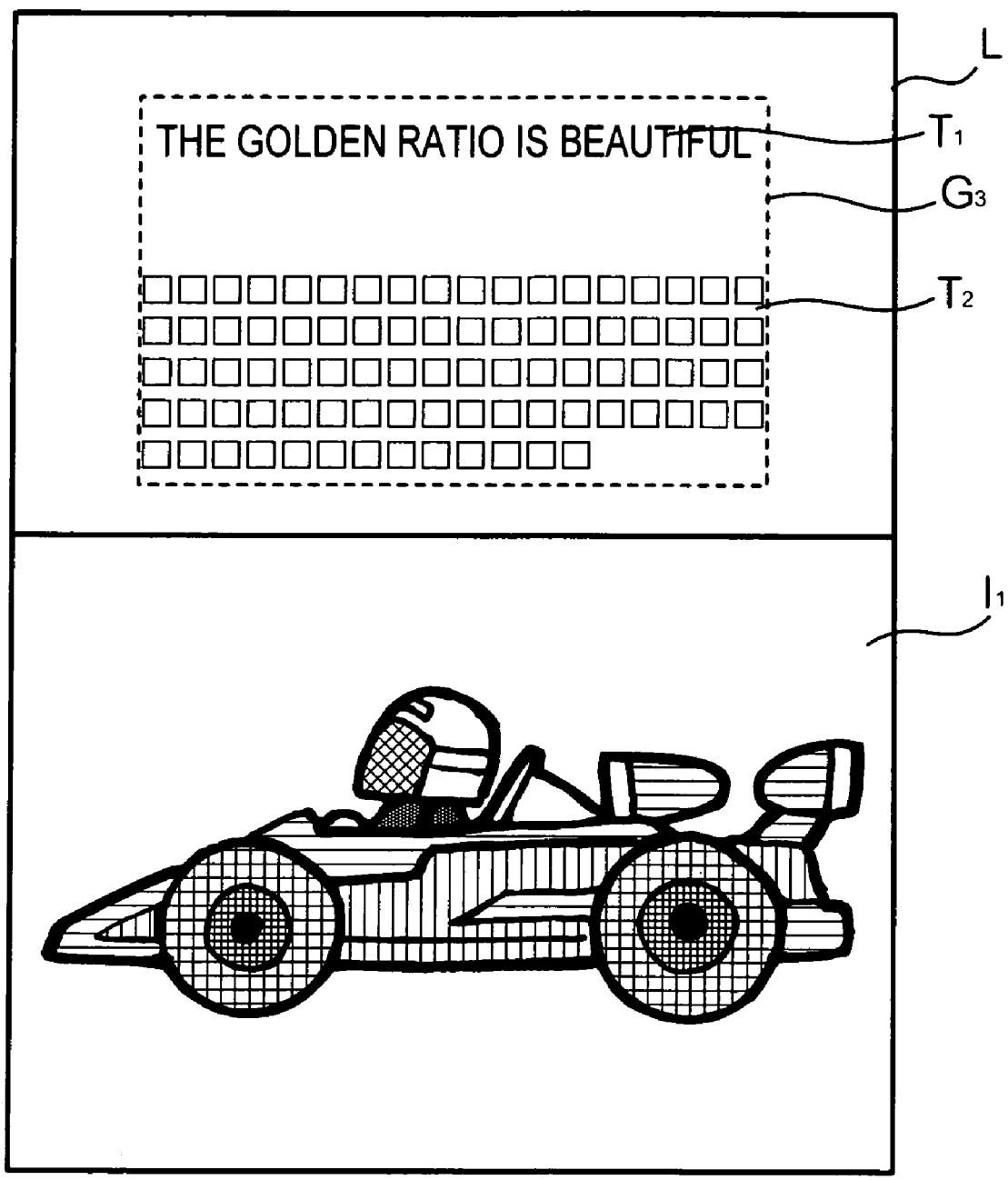
FIG. 11 shows still another example of an edited document.

FIG. 11 shows still another example of an edited document. In this example, the objects $T_1$ and $T_2$ are selected as target objects. The objects $T_1$ and $T_2$ are located to be inscribed to a golden rectangle $G_3$. The golden rectangle $G_3$ is a laterally long golden rectangle.

Figure 12:
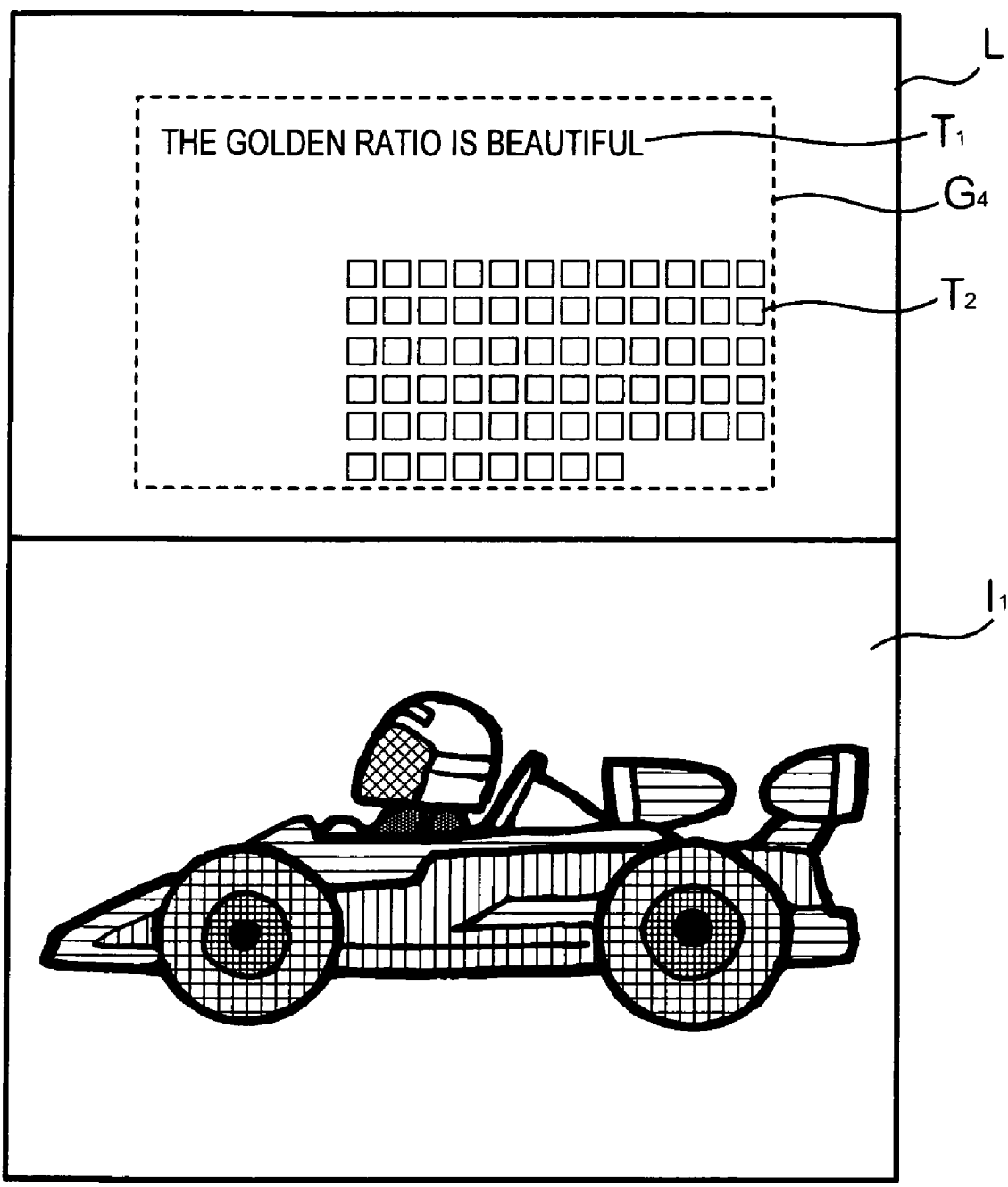
FIG. 12 shows still another example of an edited document.

FIG. 12 shows still another example of an edited document. In this example, objects $T_1$ and $T_2$ are selected as target objects. The objects $T_1$ and $T_2$ are located to be inscribed to a golden rectangle $G_4$. The golden rectangle $G_4$ is a laterally long golden rectangle.

According to an embodiment as has been described above, a document may be edited with a well-balanced layout over a layout area or, in other words, with an aesthetically pleasing layout.

3. Further Embodiments

The invention is not limited to the above embodiment but may be variously modified in practical use. From modifications described below, descriptions of matters which are common to the above embodiment will be omitted. Components common to the above embodiment will be denoted by common reference symbols.

3-1. Modification 1

Figure 13:
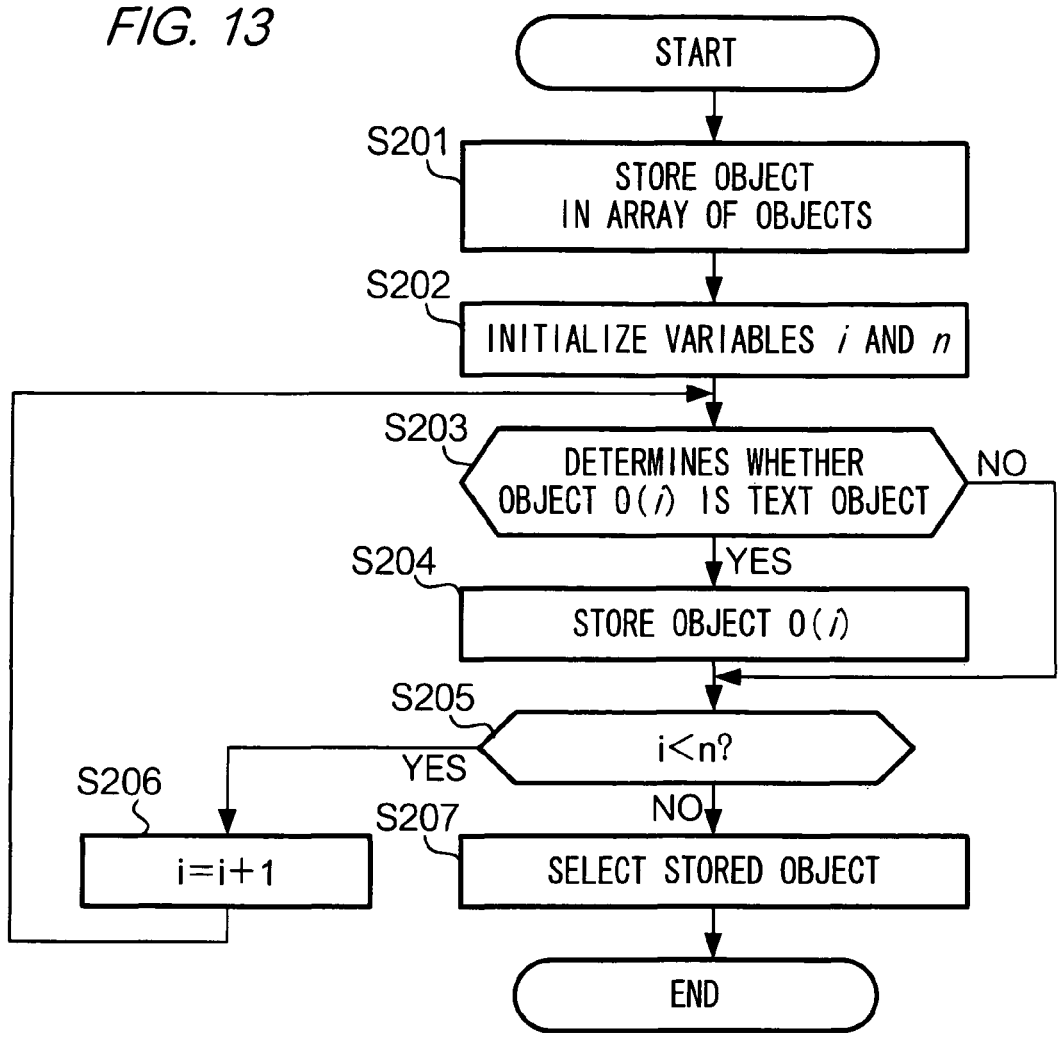
FIG. 13 is a flowchart showing details of an object selection processing according to Modification 1.

FIG. 13 is a flowchart showing details of an object selection processing according to Modification 1. In Modification 1, target objects are selected based on object types. In Modification 1, the flow shown in FIG. 13 is used in place of the flow shown in FIG. 5.

In a step S201, the CPU 110 stores obtained objects arranged in an array into the RAM 130. In a step S202, the CPU 110 initializes variables i and n. The variable i indicates an object which is a target to be subjected to a determination. The variable n indicates the total number of obtained objects. The CPU 110 sets i=1 and n=3. In a step S203, the CPU 110 determines whether an object O(i) is a text object or not. Each object has, as attribute information, information indicating its own object type. The CPU 110 therefore determines the type of each object on the basis of attribute information. If the object O(i) is determined to be a text object (S203: YES), the CPU 110 shifts the processing to a step S204. If the object O(i) is not determined to be a text object (S203: NO), the CPU 110 shifts the processing to a step S205.

In the step S204, the CPU 110 stores an identifier of the object O(i) into the RAM 130. Alternatively, the CPU 110 may store the object O(i) into the RAM 130. Thus, the identifier of the text object is stored into the RAM 130.

In a step S205, the CPU 110 determines whether or not there is any object which has not yet been a target to be subjected to a determination, i.e., whether the variables i and j satisfy a condition of i<n or not. If it is determined that there still is an object which has not yet been a target to be subjected to a determination (S205: YES), the CPU 110 shifts the processing to a step S206. If it is determined that there is not any object which has not yet been a target to be subjected to a determination (S205: NO), the CPU 110 shifts the processing to a step S207.

In the step S206, the CPU 110 updates the variable i to i=i+1. After updating the variable i, the CPU 110 shifts the processing to the step S203.

In the step S207, the CPU 110 selects, as a target object, an object whose identifier is stored in the RAM 130, e.g., a text object. Thus, according to Modification 1, a text object is selected as a target object. FIGS. 10 to 12 show examples in which a text object is selected as a target object.

From all of the objects extracted as text objects, the number of objects may be narrowed based on conditions. For example, an available one of such conditions is that "m objects (m is a positive integer which satisfies m≧2) are selected in an order starting with an object including the greatest number of characters". In this case, the CPU 110 obtains the number of characters for each of text objects and stores the number together with an associated identifier, in the step S204. In the step S207, the CPU 110 selects, as target objects, one after another of the m objects in the order starting with an object including the greatest number of characters.

In the step S203, image objects may be extracted in place of text objects extracted as described above.

3-2. Modification 2

Figure 14:
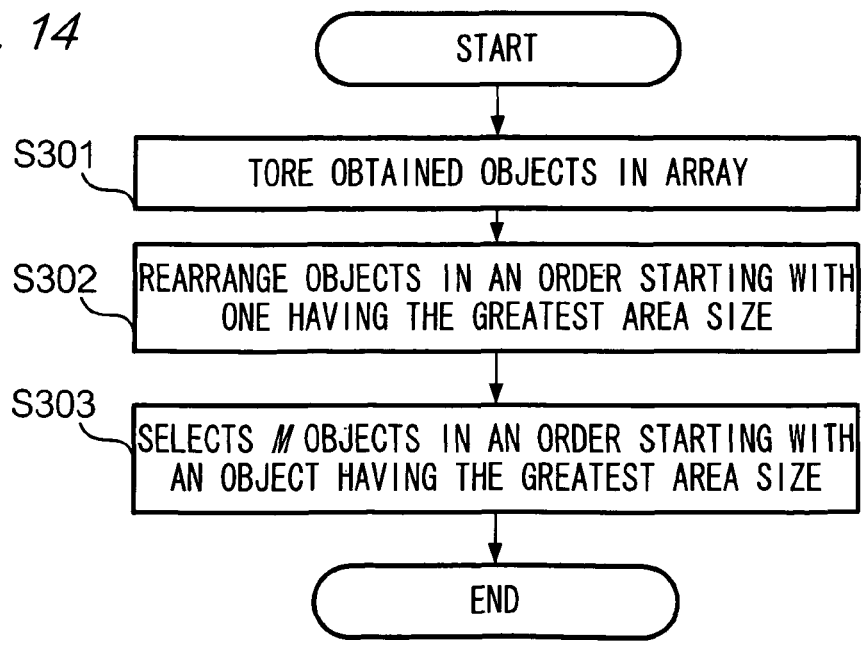
FIG. 14 is a flowchart showing details of an object selection processing according to Modification 2.

FIG. 14 is a flowchart showing operation of an object selection processing according to Modification 2. In Modification 2, target objects are selected based on area sizes. In this modification, the flow shown in FIG. 14 is used in place of the flow shown in FIG. 5.

In a step S301, the CPU 110 stores obtained objects arranged in an array into the RAM 130. In a step S302, the CPU 110 rearranges the objects in an order starting with one having the greatest area size. Each object has information indicating its area size as attribute information. The CPU 110 determines the area size of each object, based on the attribute information. In a step S303, the CPU 110 selects m objects in an order starting with an object having the greatest area size. Thus, according to Modification 2, objects having greater area sizes are selected as target objects.

In place of area sizes, importance levels may be used. Since each object may have information indicating a priority of the object, the CPU 110 determines an importance level for each object, based on the attribute information. Alternatively, the CPU 110 may calculate importance levels of objects from attribute information indicating categories or priorities, in accordance with a predetermined algorithm. In this case, the HDD 150 stores a table or a function used for converting attributes into importance levels. The CPU 110 calculates importance levels of objects in accordance with the table or function. At this time, importance levels may be calculated based on combinations of plural items of attribute information. Still alternatively, the CPU 110 may calculate importance levels by use of indices of, for example, visual attractiveness, which may be obtained by known techniques.

3-3. Modification 3

Figure 15:
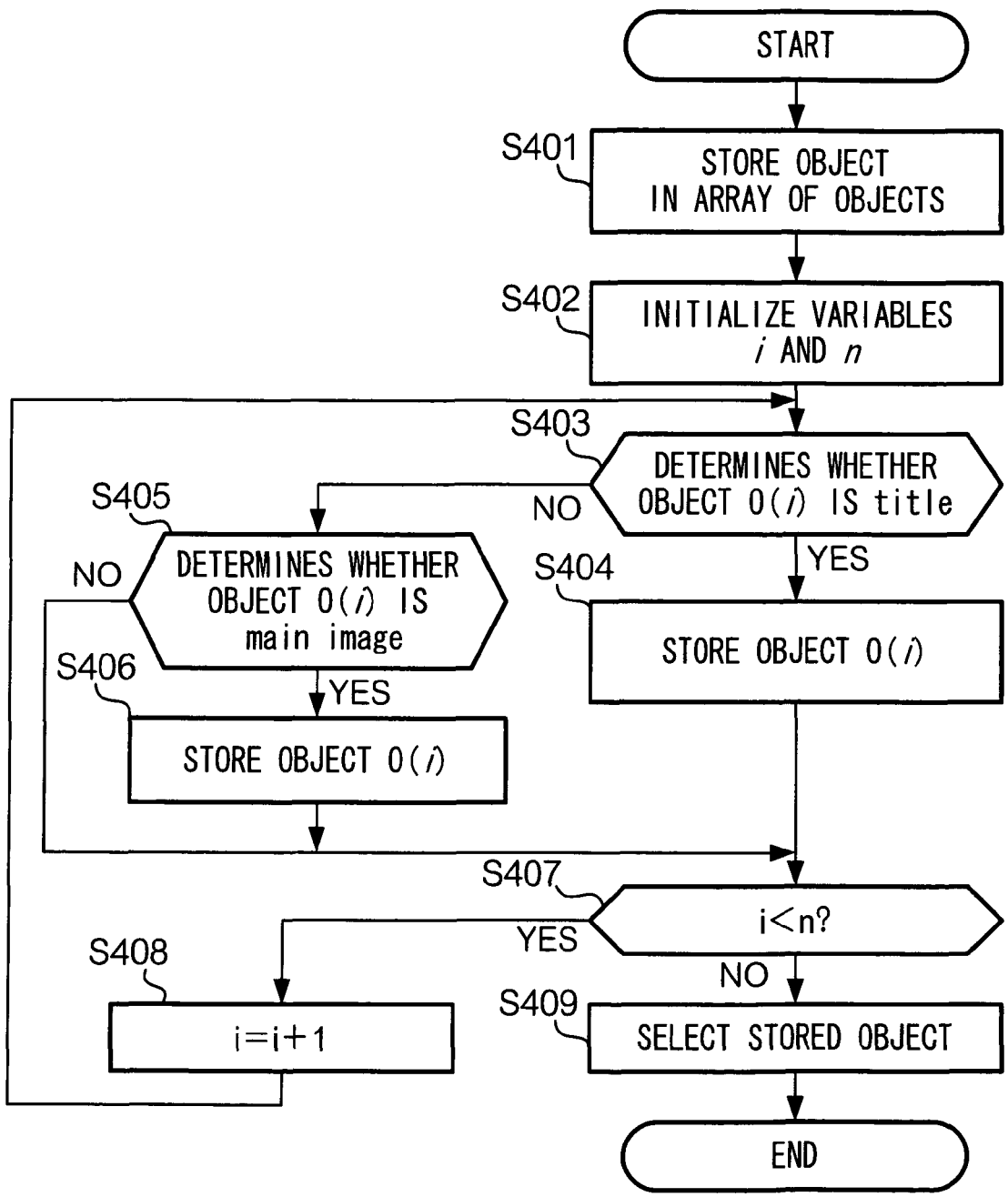
FIG. 15 is a flowchart showing details of an object selection processing according to Modification 3.

FIG. 15 is a flowchart showing details of an object selection processing according to Modification 3. In Modification 3, target objects are selected based on categories of objects. In this modification, the flow shown in FIG. 15 is used in place of the flow shown in FIG. 5.

In a step S401, the CPU 110 stores obtained objects arranged in an array into the RAM 130. In a step S402, the CPU. 110 initializes variables i and j. The variable i indicates an object as a target to be subjected to a determination. The variable n indicates the total number of obtained objects. The CPU 110 sets i=1 and n=3.

In a step S403, the CPU 110 determines whether the category of an object O(i) is "title" or not. Since each object has, as attribute information, information indicating its own category, the CPU 110 determines the category of each object on the basis of the attribute information. If the category of the object O(i) is determined to be "title" (S403: YES), the CPU 110 shifts the processing to a step S404. If the category of the object O(i) is not determined to be "title" (S403: NO), the CPU 110 shifts the processing to a step S405.

In a step S404, the CPU 110 stores an identifier of the object O(i) into the RAM 130. Alternatively, the CPU 110 may store the object O(i) into the RAM 130. Thus, the identifier of the object classified in the category "title" is stored into the RAM 130.

In a step S405, the CPU 110 determines whether the category of the object O(i) is "main image" or not. If the category of the object O(i) is determined to be "main image" (S405: YES), the CPU 110 shifts the processing to a step S406. If the category of the object O(i) is not determined to be "main image" (S405: NO), the CPU 110 shifts the processing to a step S407.

In a step S406, the CPU 110 stores an identifier of the object O(i) into the RAM 130. Thus, the identifier of the object O(i) is stored into the RAM 130.

In a step S407, the CPU 110 determines whether there is any unprocessed object or not, i.e., whether the variables i and j satisfy a condition i<n or not. If it is determined that there is an unprocessed object (S407: YES), the CPU 110 updates the variable i to i=i+1. After updating the variable i, the CPU 110 shifts the processing to the step S403.

If it is determined that there is no unprocessed object (S407: NO), the CPU 110 selects, as a target object, an object whose identifier is stored in the RAM 130, i.e., an object whose category is "title" or "main image" (S409). Thus, according to Modification 3, an object of a particular category is selected as a target object.

3-5. Other Modifications

In the step S100, objects need not be obtained together with a target document. That is, each object and layout information need not be obtained simultaneously from a single source. For example, objects and a target document may be obtained from any other devices via a network and the network IF 180. Alternatively, objects and a target document may be input in accordance with a user's operation of the keyboard/mouse 160.

In the step S121, the object to be selected as a reference object is not limited to the widest target object. As an alternative, a target object which has the greatest height (in a vertical direction) may be selected as a reference object. The positional relationship between a reference object and a golden rectangle is not limited to correspondence between reference edges as described previously. For example, the positional relationship may be correspondence between a reference point (such as an upper left apex) of a reference object and a reference point (such as an upper left apex as well) of a golden rectangle.

The conditions used in the step S123 are not limited only to those described in the above embodiment. For example, only one of the conditions (i) and (ii) may be used. FIG. 9 shows an example of using only the condition (ii). A golden rectangle $G_1$ is adopted to be effective though an object $T_2$ as one other object overlaps the golden rectangle $G_1$. Alternatively, a different condition from the conditions (i) and (ii) may also be used. An example of such a different condition is that a golden rectangle shall have an area whose size is not less than a predetermined threshold.

A processing equivalent to the step S123 may be performed after the step S130. In this case, the processing of the step S123 is not executed along the flow shown in FIG. 6. In the step S130, the CPU 110 carries out processing for changing locations of objects with respect to plural golden rectangles (e.g., candidates for golden rectangles). After this processing in the step S130, the CPU 110 selects a golden rectangle from among the plural golden rectangles, which does not cause objects to overlap each other after the locations are changed.

After the step S130, processing may be carried out to determine whether an edited document satisfies a predetermined condition or not. The condition could be, for example, that objects shall not overlap each other. In this case, the CPU 110 displays a message indicating a determination result on the display 170. Alternatively, if the condition is not satisfied, the CPU 110 may further perform a processing for editing a document so as to satisfy the condition. In this case, the CPU 110 expands a golden rectangle in relation to a point taken as a reference point. The CPU 110 moves a reference object and other objects such that they are inscribed to the expanded golden rectangle. The CPU 110 further moves respective objects in predetermined directions to eliminate overlap. For example, an object expressing a title is moved to the left while an object expressing a body of text is moved to the right. FIG. 12 shows an example of a document edited in this manner.

The numbers of objects and target objects are not limited to those described in the embodiment and modifications. A target document may include four or more objects. Three or more objects may be selected as target objects. If three or more objects are selected as target objects, not all of the target objects need be inscribed to a golden rectangle. These target objects need only to satisfy the conditions (i) to (iii) used in the step S113.

Attribute information which each object has is not limited to information as described in the above embodiment or modifications. For example, the following items may be available as attributes: (1) object type (such as "text" or "image"); (2) object category (such as "title", "subtitle", "body", "main image", or "sub-image"); (3) font size; (4) font type (such as "mincho" or "gothic"); (5) font style (such as "standard", "bold", or "italic"); (6) object size (such as "area", "number of characters", or "number of pixels"); (7) object priority ("high", "middle", "low", or any other index); and (8) content of an image (such as "portrait", "landscape", "mountain", or "flower"). An object need not include all the attributes cited above as examples.

An object need not always have attribute information. Attributes of an object may be determined by separate data from the object, such as layout information. Alternatively, attributes of an object may be determined in advance.

In the above embodiment and modifications, data, information, parameters, and the like which are stored in the HDD 150 may be stored in any other device than the HDD 150. For example, document data may be stored in a device other than the document edit device 100. In this case, the document edit device 100 obtains document data from the other device by communication or direct connection with the other device via a network. In this case, the document edit device 100 need not store the document data in advance. Alternatively, data, information, parameters, and the like may be input by users.

In the above embodiment and modifications, data, information, or parameters which are "predetermined" or "determined in advance" may be determined in accordance with instructions input by a user. Alternatively, such data, information, parameters, and the like may be determined in accordance with predetermined algorithms by the CPU 110.

In the above embodiment and modifications, the ratio described as a "golden ratio" may be replaced with any ratio other than the golden ratio. Although the examples described above only deal with one target object, the invention is applicable also to a case of dealing with plural target objects.

In the above embodiment and modifications, the document edit program is stored in the HDD 150. However, the document edit program may be provided from a storage medium such as a CD-ROM (Compact Disk Read Only Memory).

What is claimed is:

1. A document edit device, comprising:
an object obtaining unit configured to obtain objects, each being data expressing at least one of a text and an image, which is included in a document as an edit target to be edited;
an object selection unit configured to select at least two target objects from the objects obtained by the object obtaining unit, the target objects, each being an object as a processing target to be processed, the target objects including a first target object and a second target object;
a golden rectangle forming unit configured to form a golden rectangle having a first side, which is common with a side of the first target object, the first target object being inscribed in the golden rectangle, the golden rectangle being a quadrilateral having two adjacent sides of lengths between which a ratio expressed as $$1:\frac{1+\sqrt{5}}{2};$$

and
a position change unit configured to change a position of the second target object such that the second target object is inscribed in the golden rectangle at a second side, the second side being parallel to the first side.

2. The document edit device according to claim 1, wherein
the object obtaining unit is configured to obtain at least three objects, and
the object selection unit is configured to select one combination from possible combinations, each including at least two objects from among the obtained at least three objects, so that a circumscribed rectangle circumscribed to the at least two objects, which are included in the selected one combination, is closest to a golden rectangle.

3. The document edit device according to claim 1, wherein
the object obtaining unit is configured to obtain at least three objects, and
the object selection unit is configured to select a combination of only text objects or only image objects, from among the obtained at least three objects.

4. The document edit device according to claim 3, wherein the object selection unit is configured to select at least two objects from among the obtained at least three objects, in an order starting with an object having a greatest text volume.

5. The document edit device according to claim 1, wherein
the object obtaining unit is configured to obtain at least three objects, and
the object selection unit is configured to select at least two objects from among the obtained at least three objects, in an order starting with an object having a greatest area.

6. The document edit device according to claim 1, wherein
the object obtaining unit is configured to obtain at least three objects, each having category information indicating a category, and
the object selection unit is configured to select at least two objects from among the obtained at least three objects, the selected at least two objects, each having particular category information.

7. The document edit device according to claim 1, wherein
the object obtaining unit is configured to obtain at least three objects, each having attribute information indicating an attribute,
the document edit device further comprises an importance level determination unit configured to determine an importance level for each of the obtained at least three objects, based on the attribute information of each of the obtained at least three objects, and
the object selection unit is configured to select at least two objects from among the obtained at least three objects, in an order starting with an object having a highest importance level.

8. The document edit device according to claim 1, wherein
the first target object has a side, which is parallel to a specific direction having the longest length from among the obtained objects.

9. The document edit device according to claim 8, wherein the first side is parallel to the specific direction.

10. A computer-readable storage medium storing a program causing a computer device having a processor to execute a process, the process comprising:
obtaining, by the processor, objects each being data expressing at least one of a text and an image, which is included in a document as an edit target to be edited;
selecting, by the processor, at least two target objects from the obtained objects, the target objects each being an object as a processing target to be processed, the target objects including a first target object and a second target object;
forming, by the processor, a golden rectangle having a first side, which is common with a side of the first target object, the first target object being inscribed in the golden rectangle, the golden rectangle being a quadrilateral having two adjacent sides of lengths between which a ratio expressed as $$1:\frac{1+\sqrt{5}}{2};$$

and
changing, by a processor, a position of the second target object so as to be inscribed in the formed golden rectangle at a second side, the second side being parallel to the first side.

* * * * *